(12) United States Patent
Tomas Boix

(10) Patent No.: US 7,735,175 B2
(45) Date of Patent: Jun. 15, 2010

(54) DEVICE WITH MOVEABLE PORTICO TO AUTOMATICALLY WASH VEHICLES

(75) Inventor: Rafael Tomas Boix, L'Alcudia (ES)

(73) Assignee: Istobal S.A., L'alcudia, Valencia (ES)

( * ) Notice: Subject to any disclaimer, the term of this patent is extended or adjusted under 35 U.S.C. 154(b) by 1260 days.

(21) Appl. No.: 11/175,106

(22) Filed: Jul. 5, 2005

(65) Prior Publication Data

US 2006/0102209 A1 May 18, 2006

(30) Foreign Application Priority Data

Nov. 17, 2004 (ES) .............................. 200402601 U

(51) Int. Cl.
*B60S 3/06* (2006.01)
(52) U.S. Cl. ........................... 15/53.2; 15/97.3; 134/123
(58) Field of Classification Search .................. 15/53.1, 15/53.2, 97.3, DIG. 2; 134/123, 129–131

See application file for complete search history.

(56) References Cited

U.S. PATENT DOCUMENTS

| | | | | | |
|---|---|---|---|---|---|
| 3,819,991 | A | * | 6/1974 | Weigele et al. ................. | 318/39 |
| 4,009,303 | A | * | 2/1977 | Faris ........................... | 427/287 |
| 4,050,109 | A | * | 9/1977 | Learned ....................... | 15/53.2 |
| 4,685,169 | A | * | 8/1987 | Nelson ......................... | 15/302 |
| 6,145,146 | A | * | 11/2000 | Decker ........................ | 15/53.2 |

FOREIGN PATENT DOCUMENTS

GB 2190341 A * 11/1987

* cited by examiner

*Primary Examiner*—Laura C Guidotti
(74) *Attorney, Agent, or Firm*—Merchant & Gould P.C.

(57) ABSTRACT

A device with a moveable portico for automatically washing vehicles that is made up of a unibody structure, preferably made of metal that moves forwards and backwards along a track. The structure has multiple vertical brushes and a horizontal brush. The brushes are equipped with a washing action in order to adapt to a configuration that follows the vehicle's outline and to wash the vehicle by rubbing, controlling the pressure all of the brushes place on the vehicle by means of electronic devices that measure the energy consumed by each brush.

6 Claims, 2 Drawing Sheets

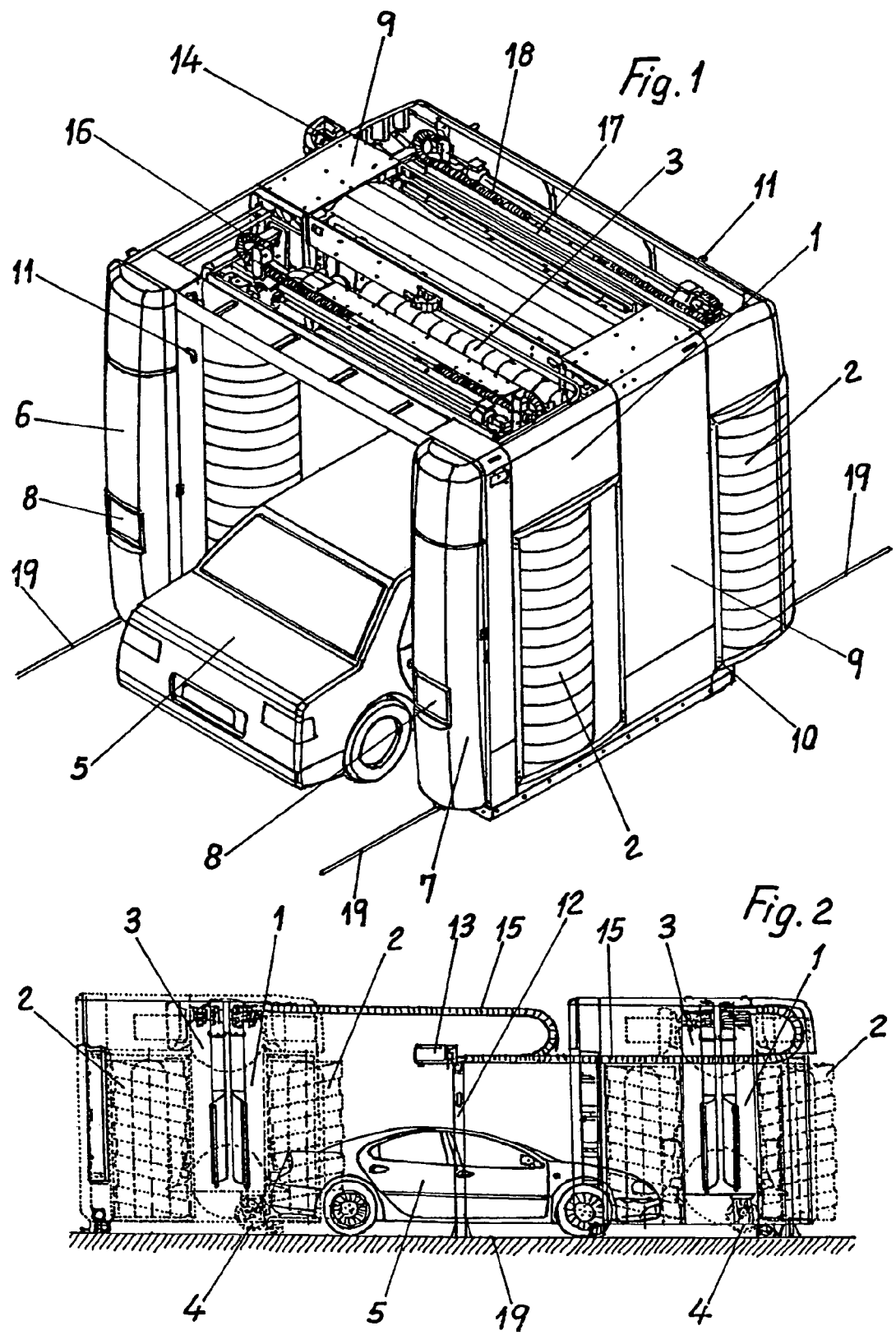

DEVICE WITH MOVEABLE PORTICO TO AUTOMATICALLY WASH VEHICLES

PURPOSE OF THE INVENTION

The purpose of this invention is a device in the form of a portico that can move forwards and backwards to wash and dry rental cars, vans, and other unspecified vehicles by performing multiple functions. These functions include one or more movements forwards or backwards by said devices in order to carry out washes, including: waxes, lather, high-pressure operations, fast or slow rinses, pre-washes, washing tires, washing undercarriages, and many other operations. This device can be used indifferently for stretch automobiles and other, much shorter vehicles because it is equipped with some sensors that travel longer or shorter distances, saving time and the products to be used, These features make this device with a portico universally useful for any properly positioned vehicle that remains stationery under the cleaning device, which moves forwards or backwards to carry out its function.

PRECURSORS TO THE INVENTION

Current techniques cover the existence of various systems pertaining to moveable porticos for washing and drying automotive vehicles ranging from those existing ones that take the form of unibody devices with two vertical brushes and one horizontal brush for washing and two lateral nozzles and one upper, horizontal nozzle for drying to those existing ones that take the form of two-body devices with independent motion and tracks, or even those two-body devices that are joined contiguously between those that mount two moveable, vertical brushes plus two more horizontal ones, with lateral and overhead drying nozzles on each of the parts. Considering that this last form is not the most effective way of dealing with the large amount of dirt deposited on the sides of vehicles, traveling a minimal distance, and in light of various drawbacks to known systems, their lack of quality in the rinses, and operational deficiencies, we have seen the convenience of incorporating four vertically-placed brushes, along with one horizontal brush, and also locating on the device, the object of this invention, various means of cleaning, performing the entrusted duties to complete satisfaction and traveling a minimal distance and in a minimum amount of time.

DESCRIPTION OF THE INVENTION

Essentially, and with the purpose of performing distinct washing operations, the moveable portico device in question incorporates a moveable structure, preferably made from a single metallic body, to which structure we attach four vertical brushes (in sets of two) that function independently, also attaching a brush placed horizontally to wash the top, front, and back portions of the automobile, also incorporating two or four lateral drying vents and one or two horizontal drying sets equipped with two ventilators per set.

One of the most important characteristics of this new washing portico is that, on a track with dimensions similar to that of a moveable unibody portico with three brushes, we can wash and dry the same vehicle in a much shorter time and with high quality performance. During the "forward" movement, the front hood portion of the vehicle is washed using the horizontal brush and the two rear vertical brushes, while the rear portion of the vehicle is washed using the two front vertical brushes located on the front portion of the portico and the horizontal one for this area. While the portico is moving, the sides of the vehicle are washed by the four vertical brushes: the first two (one for each portion of the vehicle) followed by the second two. At the same time, the (front and rear) wheels are washed in special form by the corresponding wheel washer. During the "backward" movement [of the portico], the simple drying, with two lateral nozzles and one horizontal, upper nozzle or with four lateral nozzles and two upper ones.

Both sides of the portico included in the device for automatically washing automotive vehicles contain some enclosures for consumable products and product dosage pumps, as well as some external indicator lights showing the position of the vehicle in order to clean it. The aforementioned enclosures also contain the electrical control panel. Both sides of the portico incorporate a unibody structure, duly faired, the interior of which contains mounted, hydraulic centers that feed the corresponding hydraulic cylinders for the horizontal dryer and horizontal brush. It has also been fitted with anti-spatter screens.

The upper portion of the portico comprising the device in question has nozzles in front and in back; this form allows it to cover the entire length of the vehicle. Furthermore, there are other arches with nozzles to spray water, shampoo, lather, etc., over the vehicle depending on the wash operation selected.

The general function of moving the device on rails can be performed using two engine reducers (one on each pedal). For the washing function, the vertical brushes move along a track on transversal elevated guides, allowing them to operate independently from each other and to conform to the perimeter of the automotive vehicle in proportion with the front, side, and rear surfaces, while the horizontal brush moves along vertical guides following the vehicle's profile along its front, engine hood, windshield, roof, rear window, trunk, and tailgate, such that, during this process and based on the type of wash requested, first water and shampoo are sprinkled on the vehicle and later only water for the rinse.

For the drying function, the side vents will be used along with the upper, horizontally placed ones that pass over the automobile's profile, while remaining at a constant distance appropriate for safety. Prior to the drying process, some nozzles deposit protective wax on the vehicle to help in the drying process.

Optionally, the device including a moveable portico for automatically washing automobiles, the subject of this invention, may have a large number of different washing functions covering: applying hot wax, colored lather, pre-wash, high pressure, slow rinses, undercarriage protection, with the ability to cover the entire range of available options, such as different types of chemical sprays, active lather, or any other unspecified product and application that is feasible for using brushes made from polyethylene or any other appropriate material.

The device of the invention may also include an electronic control system with the means of measuring the consumption of energy by the motors turning the brushes and actuators for the movement mechanisms during the wash, so that said brushes use uniform pressure to wash the entire vehicle surface.

Below, we refer to the accompanying drawings, which graphically and schematically depict a preferential example for the practical realization of the device with a moveable portico for automatically washing automobiles to which we have been referring, with the proviso that, given the imminently informative nature of the drawings in question, the figures drawn therein should be examined under the broadest criteria and without being limitative in any way.

DESCRIPTION OF THE DRAWINGS

The figures represented in the attached drawings depict [the invention] as described below:

FIG. 1.—Perspective drawing of the whole assembly comprising the moveable portico, forming the device for automatically washing automobiles, showing the positioning of the vertical brushes placed in sets of two on each side, the general structure of the portico with the electrical control panels, the side panels, and the set of mechanisms for activating it, with rails on the two sides of a large central cavity, in which the automotive vehicle would be placed or positioned in order to be washed.

FIG. 2.—Longitudinal-lateral overhead drawing of the device with the moveable portico, shown in the extreme forward and extreme backward positions, with the automobile to be washing being in a central and fixed position. We also see the flexible electrical cord as the device is moving, the lateral brushes, the horizontal brush, and the lower brushes for washing the wheels, along with their other operating accessories.

Figure 3:
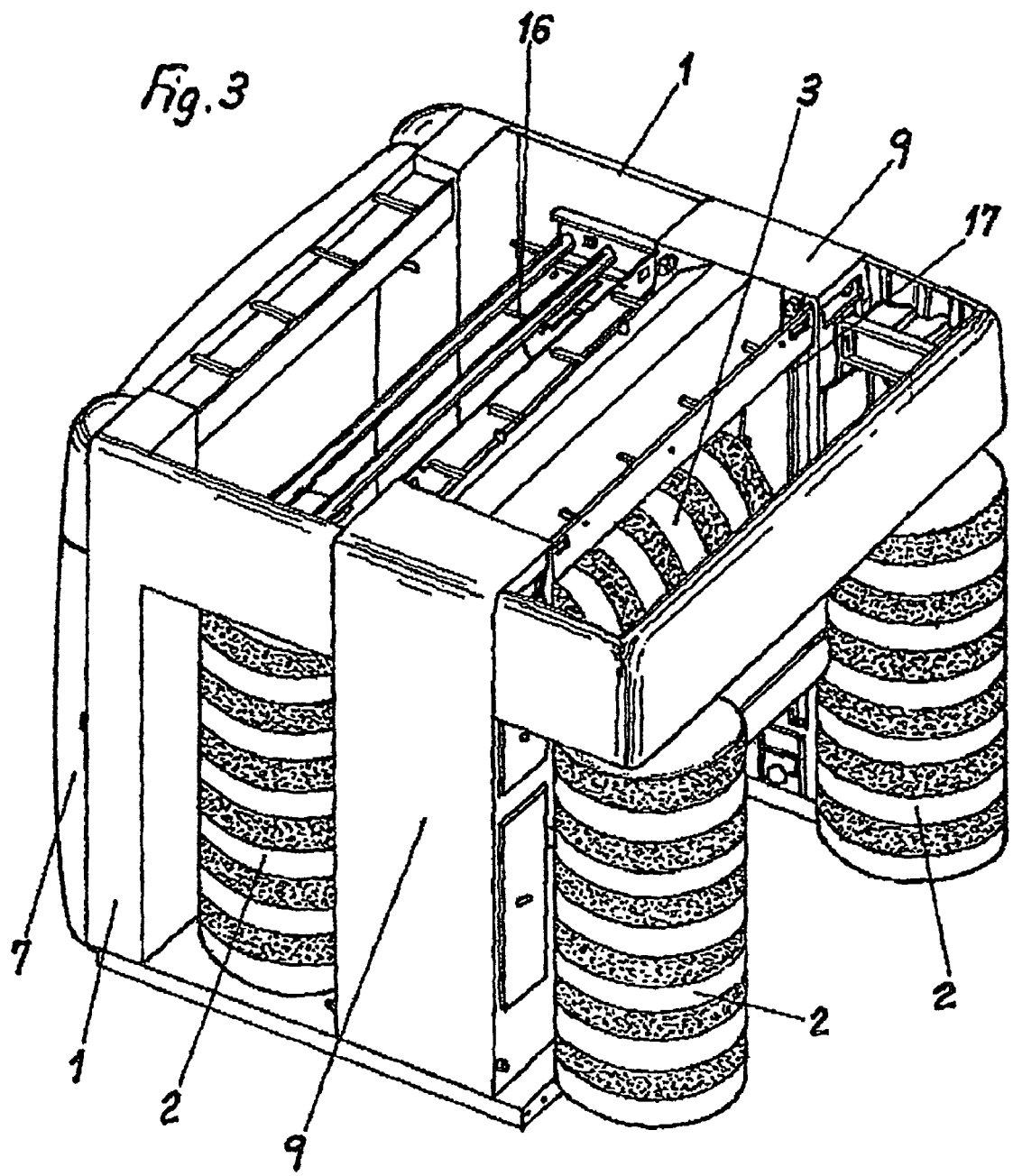
FIG. 3.—Perspective drawing of the assembly corresponding to the moveable portico shown for the rear end as compared to the depiction in FIG. 1. We see the vertical brushes on both sides and the horizontal brush.

Still referring to the attached drawings, we must point out that, in the various figures shown therein, we have included numerical notations associated with the descriptions, the features and operations of which are presented below, thereby facilitating their immediate identification. Thus, 1, is the unibody structure, preferably constructed out of metal, forming the moveable portico, the structure of which carries four vertical brushes 2 for cleaning, with two placed on each side and which operate independently. On the inside, there is a brush 3 placed horizontally. Also on the sides, there are some low brushes 4 for washing the wheels of the automotive vehicle 5 located inside the portico 1 and centrally positioned in order to clean and wash it.

FORM OF EMBODIMENT

The front portion and both sides of the moveable portico 1 have an electrical control panel 6 on one side and storage for consumable products and storage for dosage pumps 7 on the other side with some indicator lights 8 on the front showing the positioning of the vehicle 5, so as to proceed with washing it. Both sides of the portico also have a space with fairing 9 that stores the hydraulic centers for the horizontal dryer and horizontal brush, as well as the heater, including the portico forward of the vertical brushes 2 and, externally, the upright 10 for applying detachable anti-spatter screens.

In the front and rear portions of the portico 1 and in the top, there are some nozzles 11 for supplying water, shampoo, etc. To enable the device's electrical action, there is a fixed column 12 with an inspection hatch 13 for raising the fitting 14 to the flexible hoses 15. For the horizontal dryer, there is a front set 16 and a rear set 17, as well as some guides 18 for the independently acting, vertical brushes 2. The moveable portico 1 runs on fixed rails 19 in the ground.

Once each and every part comprising the device with a moveable portico for automatically washing automobiles, the object of the invention, has been fully described, the only thing remaining for us to do is point out the possibility that different parts can be manufactured from a variety of materials and in different sizes and shapes, that they can be applied to a broad range of actions with one or more movements forwards or backwards performing multiple functions by using various cleaning and beautification materials, as well as ends to the course that reverse its progress on the rails. Such construction variations may also be added to its composition as recommended by practice, whenever these are not capable of modifying the essential points of the object of this invention.

The invention claimed is:

1. A moveable portico device for automatically washing vehicles, the moveable portico device having a single body structure, preferably made of metal, wherein the single body structure is configured to move forward and backward along a direction of a track, said structure including a first side and a second side and comprising:
    a front portion having a plurality of front vertical revolving brushes, an electrical control panel on the first side, and a storage for consumable products and dosage pumps on the second side, and wherein the front portion has lights thereon;
    a rear portion having a plurality of rear vertical revolving brushes; and
    at least one horizontal revolving brush;
wherein the front and rear vertical revolving brushes and the at least one horizontal revolving brush are displaceable in planes that are substantially perpendicular to the direction of the track, and wherein the brushes are arranged and configured to wash a vehicle by rubbing the vehicle;
    fairings located at the first and second sides and spacing the front portion and the rear portion; and
    nozzles arranged in the front portion, the rear portion, and a top portion; and
wherein the moveable portico further comprises an affixed column with an inspection hatch.

2. The device according to claim 1 wherein when said single body structure moves forward:
    the horizontal brush and two of the rear vertical revolving brushes are configured to wash a front portion of the vehicle;
    two of the front vertical revolving brushes and two of the rear vertical revolving brushes are configured to wash sides of the vehicle; and
    two of the front vertical revolving brushes and the horizontal brush are configured to wash a rear portion of the vehicle.

3. The device according to claim 2 further comprising drying elements comprising:
    at least two lateral nozzles, one on each of the first and second sides of the moveable portico; and
    at least one upper horizontal nozzle;
wherein the nozzles include an exit slot configured to form a narrow column of air; and
wherein the nozzles are configured to dry the vehicle when said single body structure moves backward.

4. The device according to claim 3 comprising four lateral nozzles and two upper horizontal nozzles.

5. The device according to claim 1 wherein the vertical brushes:
    are the same length; and
    are configured to reach a distance longer than that of the vehicle when washing a front portion of the vehicle or a rear portion of the vehicle, during the washing motion, to ensure that the front portion and the rear portion are being washed.

6. The device according to claim 1 further comprising an electronic control system having means for measuring the consumption of energy by motors turning the brushes and actuators for the movement mechanisms during a wash, so that said brushes use uniform pressure to wash the entire vehicle surface.

\* \* \* \* \*